(12) United States Patent
Shugart et al.

(10) Patent No.: US 8,647,534 B2
(45) Date of Patent: Feb. 11, 2014

(54) COPPER-CARBON COMPOSITION

(75) Inventors: Jason V. Shugart, Waverly, OH (US);
Roger C. Scherer, Portsmouth, OH (US)

(73) Assignee: Third Millennium Materials, LLC, Waverly, OH (US)

( * ) Notice: Subject to any disclaimer, the term of this patent is extended or adjusted under 35 U.S.C. 154(b) by 0 days.

(21) Appl. No.: 12/820,350

(22) Filed: Jun. 22, 2010

(65) Prior Publication Data

US 2010/0327233 A1  Dec. 30, 2010
US 2013/0062572 A2  Mar. 14, 2013

Related U.S. Application Data

(60) Provisional application No. 61/219,909, filed on Jun. 24, 2009.

(51) Int. Cl.
*H01B 1/02* (2006.01)
*H01B 1/04* (2006.01)

(52) U.S. Cl.
USPC ......... 252/503; 252/516; 252/521.5; 420/469

(58) Field of Classification Search
USPC ............. 252/503, 516, 521.5; 420/469
See application file for complete search history.

(56) References Cited

U.S. PATENT DOCUMENTS

| | | | |
|---|---|---|---|
| 1,204,927 A | 11/1916 | Antisell | |
| 1,775,159 A | 9/1930 | Donaldson et al. | |
| 2,060,133 A | 11/1936 | Summey | |
| 2,060,137 A | 11/1936 | Bahney | |
| 2,131,396 A | 9/1938 | Zublin et al. | |
| 2,177,070 A | 10/1939 | Kikuchi | |
| 2,670,284 A | 2/1954 | Zvanut | |
| 3,164,482 A | 1/1965 | Renkey | |
| 3,353,807 A | 11/1967 | Sixel et al. | |
| 3,385,494 A | 5/1968 | Themelis et al. | |
| 3,782,924 A | 1/1974 | Van Houten | |
| 3,891,426 A | 6/1975 | Stawicky et al. | |
| 3,896,257 A | 7/1975 | Kinoshita | |
| 3,908,072 A | 9/1975 | Collin | |
| 3,985,545 A | 10/1976 | Kinoshita | |
| 3,993,478 A | 11/1976 | Hay et al. | |
| 4,083,719 A * | 4/1978 | Arakawa et al. | 75/229 |
| 4,171,232 A | 10/1979 | Finster et al. | |
| 4,353,738 A | 10/1982 | Persson | |
| 4,385,930 A | 5/1983 | Persson | |
| 4,726,842 A | 2/1988 | Reeve et al. | |
| 4,767,451 A | 8/1988 | Bergman et al. | |
| 4,808,219 A | 2/1989 | Metz | |
| 4,865,806 A | 9/1989 | Skibo et al. | |
| 4,916,030 A | 4/1990 | Christodoulou et al. | |
| 4,946,647 A | 8/1990 | Rohatgi et al. | |
| 5,200,003 A | 4/1993 | Rohatgi | |
| 5,219,819 A | 6/1993 | Sharma et al. | |
| 5,611,838 A | 3/1997 | Fritz et al. | |
| 5,632,827 A | 5/1997 | Fujita et al. | |
| 5,803,153 A | 9/1998 | Rohatgi | |
| 5,834,115 A | 11/1998 | Weeks, Jr. et al. | |
| 5,900,225 A | 5/1999 | Mistry et al. | |
| 6,036,889 A * | 3/2000 | Kydd | 252/512 |
| 6,063,506 A * | 5/2000 | Andricacos et al. | 428/546 |
| 6,110,817 A | 8/2000 | Tsai et al. | |
| 6,150,262 A | 11/2000 | Go et al. | |
| 6,228,904 B1 * | 5/2001 | Yadav et al. | 523/210 |
| 6,231,634 B1 | 5/2001 | Shaw | |
| 6,238,454 B1 | 5/2001 | Polese et al. | |
| 6,287,364 B1 | 9/2001 | Mizuta et al. | |
| 6,372,010 B1 | 4/2002 | Shver et al. | |
| 6,596,131 B1 * | 7/2003 | Scott et al. | 204/192.12 |
| 6,649,265 B1 | 11/2003 | Kawamura et al. | |
| 6,727,117 B1 * | 4/2004 | McCoy | 438/106 |
| 6,765,949 B2 | 7/2004 | Chang | |
| 6,799,089 B2 * | 9/2004 | Toulhoat | 700/266 |
| 6,984,888 B2 * | 1/2006 | Sung | 257/720 |
| 7,311,135 B1 | 12/2007 | Suganuma et al. | |
| 7,399,703 B2 | 7/2008 | Kawakami | |
| 7,468,088 B1 | 12/2008 | Blankenhorn et al. | |
| 7,767,113 B2 * | 8/2010 | Kobayashi | 252/503 |
| 8,541,335 B2 * | 9/2013 | Shugart et al. | 502/182 |
| 8,541,336 B2 * | 9/2013 | Shugart et al. | 502/184 |
| 2002/0019684 A1 | 2/2002 | Toulhoat | |
| 2002/0056915 A1 | 5/2002 | Go | |
| 2004/0265615 A1 | 12/2004 | Kodas et al. | |
| 2005/0061107 A1 | 3/2005 | Hampden-Smith et al. | |
| 2006/0194097 A1 | 8/2006 | Kim et al. | |
| 2007/0190348 A1 | 8/2007 | Ichiki | |
| 2008/0050589 A1 * | 2/2008 | Tsushima et al. | 428/376 |
| 2008/0093577 A1 | 4/2008 | Khraishi et al. | |

(Continued)

FOREIGN PATENT DOCUMENTS

| | | |
|---|---|---|
| JP | 54047822 | 4/1979 |
| JP | 56-041348 | 4/1981 |

(Continued)

OTHER PUBLICATIONS

CAS reg. No. 227310-68-1, Jul. 1999.*

(Continued)

*Primary Examiner* — Douglas McGinty
(74) *Attorney, Agent, or Firm* — Thompson Hine L.L.P.

(57) ABSTRACT

A copper-carbon composition including copper and carbon, wherein the copper and the carbon form a single phase material, and wherein the carbon does not phase separate from the copper when the material is heated to a melting temperature.

11 Claims, 4 Drawing Sheets

(56) References Cited

U.S. PATENT DOCUMENTS

| | | | |
|---|---|---|---|
| 2009/0176090 A1 | 7/2009 | So et al. | |
| 2009/0180919 A1 | 7/2009 | Blankenhorn et al. | |
| 2010/0035775 A1* | 2/2010 | Viswanathan | 508/123 |

FOREIGN PATENT DOCUMENTS

| | | | |
|---|---|---|---|
| JP | 58177422 | | 10/1983 |
| JP | 04-124235 | | 4/1992 |
| JP | 7-254404 | * | 10/1995 |
| JP | 08-020829 | | 1/1996 |
| JP | 11-092837 | | 4/1999 |
| JP | 11-100625 | | 4/1999 |
| JP | 3040768 | | 5/2000 |
| JP | 2008-057034 | | 3/2008 |

OTHER PUBLICATIONS

"Copper (I) acetylide", Wikipedia (English), May 16, 2011.*
CAS reg. No. 1117-94-8, Nov. 16, 1984.*
Copper, Wikipedia (English), Jul. 24, 2013, pp. 1-25.*
Diamond, Wikipedia (English), Jul. 24, 2013, pp. 1-25.*
Schubert, Thomas et al., "Carbide formation in copper-carbon composites and its effect on thermal conductivity", Advances in Powder Metallurgy & Particulate Materials, May 13-16, 2007, pp. 9-10 through 9-18.*
English translation of Japanese Publication No. 07-254404 (published Oct. 3, 1995).
Bensebaa, F. et al., "Raman characterization of metal-alkanethiolates," Spectrochimica Acta Part A, 55, pp. 1229-1236 (1999).
Fundamentals of Modern Manufacturing Materials, Processes, and Systems, published by John Wiley & Sons, Inc., p. 148 (2010).
Boehm, H.-P. et al., "Nomenclature and Terminology of Graphite Intercalation Compounds," Pure & Appl. Chem., vol. 66, No. 9, pp. 1893-1901 (1994).
PCT, International Search Report and Written Opinion, International Application No. PCT/US2010/039419 (Nov. 9, 2010).
"Tight-Binding Parameters for Copper," http:/cst-lwww.nrl.navy.mil/bind/cu.html (Nov. 3, 1999).
Andreeva, V.D. et al., "The Effect of Copper Atoms on the Graphite Structure," Technical Physics Letters, vol. 28, No. 9, pp. 759-761 (2002).
Brady, J.E., General Chemistry: Principles and Structures, 5th Edition, John Wiley & Sons, Inc., Chapter 12, pp. 366-369 (1990).
Castro Neto, A.H., "Pauling's dreams for graphene," Physics, 2, 30 (2009) DOI: 10.1103/Physics.2.30 (Apr. 20, 2009).
Charinpanitkul, T. et al., "Single-step synthesis of nanocomposite of copper and carbon nanoparticles using arc discharge in liquid nitrogen," (Abstract), ScienceDirect—Materials Chemistry and Physics, http://www.sciencedirect.com/science?_ob=ArticleURL&_udi=B6T . . . , available online Mar. 27, 2009.
Chuprasov, V.V. et al., "Obtaining Carbon Nanoparticles with the Use of Electric-Arc Discharge between Coaxial Electrodes," (Abstract), Journal of Engineering Physics and Thermophysics, vol. 77, No. 3 (May 2004).
Dumé, B., "Carbon nanotubes produce smooth nanoribbons," http://nanotechweb.org/cws/article/tech/38729 (Apr. 17, 2009).
Floriani, C., "Metal-Carbon and Carbon-Carbon Bond Formation From Small Molecules and One Carbon Functional Groups," Pure & Appl. Chem, vol. 54, No. 1, pp. 59-64 (1982).
Hirschler, B., "Scientists make super-strong metallic spider silk," Yahoo! News, http://news.yahoo.com/s/nm/20090423/sc_nm/us_spider_silk (Apr. 23, 2009).
Ionescu, V. et al., "Carbon-copper amorphous composite coatings grown by thermionic vacuum arc method," Ovidius University Annals of Chemistry, vol. 20, No. 2, pp. 193-198 (2009).
Luo, J. et al., "Phase Properties of Carbon-Supported Gold-Platinum Nanoparticles with Different Bimetallic Compositions," Chem. Mater., vol. 17, No. 12, pp. 3086-3091 (2005).
Villalobos, J.M. et al., "A New Paradigm for Carbon-Carbon Bond Formation: Aerobic, Copper-Templated Cross-Coupling," J. Am. Chem. Soc. (Nov. 30, 2007).
English translation of "Application Example 1," paragraphs [0024]-[0029] of Japanese Patent Application No. 07-254404 (published Oct. 3, 1995).
Zhang, Z.X. et al., "Density-functional calculations of $M_nC$(M=Fe, Co, Ni, Cu, n=1-6) clusters," Journal of Molecular Structure: THEOCHEM, 863 (2008) 22-27.
Shornikova, O.N. et al., "Synthesis and properties of ternary GIC with iron or copper chlorides," Journal of Physics and Chemistry of Solids, 67 (2006) 1193-1197.
Find, J. et al., "A new three-dimensional structure model for the $CuCl_2$ graphite intercalation compound," Carbon, 37 (1991) 1431-1441.
Barcena, J. et al., "Novel Copper/Carbon Nanofibres Composites for High Thermal Conductivity Electronic Packaging" (2006).
Salamanca-Riba, L. et al., "A New Type of Carbon Nanostructure Formed Within a Metal-Matrix," presented at the TechConnect World Summit & Innovation Showcase, Santa Clara, CA (Jun. 18-21, 2012).
Szczepanski, J. et al., Copper-Carbon Cluster $CuC_3$: Structure, Infrared Frequencies, and Isotropic Scrambling, J. Phys. Chem. A, vol. 112, No. 21, pp. 4778-4785 (2008).
Jena, P. et al., "Clusters and Cluster Reactions," Density Functional Theory of Molecules, Clusters, and Solids, D.E. Ellis (ed.), published by Kluwer Academic Publishers, The Netherlands, 1995, pp. 123-129, 140-147.
Reetz, M.T. et al., "Size-Selective Synthesis of Nanostructured Transition Metal Clusters," J. Am. Chem. Soc., 116, pp. 7401-7402 (1994).
Chinese Application No. 201080033225.7, Notification of First Office Action, Jul. 22, 2013.
EAPO Application No. 201270042/28, Office Action, Jul. 2, 2013.

* cited by examiner

COPPER-CARBON COMPOSITION

PRIORITY

The present patent application claims priority from U.S. Ser. No. 61/219,909 filed on Jun. 24, 2009, the entire contents of which are incorporated herein by reference.

FIELD

The present patent application relates to compositions that include copper and carbon and, more particularly, to copper-carbon compositions that do not phase separate when melted or re-melted.

BACKGROUND

Copper metal is commonly used in various electrical and mechanical applications due to its relatively high electrical and thermal conductivity. However, copper metal is very ductile, which limits its use in mechanical and structural applications. Furthermore, copper metal tends to corrode and oxidize over time, thereby limiting its application in various reactive environments.

Copper-carbon composites have been developed in an effort to improve upon the thermal, mechanical and chemical properties of copper metal. Copper-carbon composites are formed by mechanically introducing carbon to copper metal, thereby imparting the resulting copper-carbon composite material with certain advantages (e.g., improved thermal conductivity) over pure copper metal. For example, copper-carbon composites have been prepared using copper and carbon powder metallurgy techniques, as well as by heating and kneading copper and carbon together.

However, like copper metal, copper-carbon composites have physical properties that limit their usefulness in certain applications. For example, the carbon in copper-carbon composites phase separates from the copper metal when the composite is melted, thereby limiting the usefulness of copper-carbon composites in high temperature applications.

Accordingly, those skilled in the art continue to seek improvements in the properties of copper metal.

SUMMARY

In one aspect, the disclosed copper-carbon composition may include copper and carbon, wherein the copper and the carbon form a single phase material, and wherein the carbon does not phase separate from the copper when the material is heated to a melting temperature.

In another aspect, the disclosed copper-carbon composition may consist essentially of copper and carbon, wherein the copper and the carbon form a single phase material, and wherein the carbon does not phase separate from the copper when the material is heated to a melting temperature.

In yet another aspect, the disclosed copper-carbon composition may consist essentially of copper and carbon, wherein the copper and the carbon form a single phase material, the carbon comprising at least about 0.01 percent by weight of the material, and wherein the carbon does not phase separate from the copper when the material is heated to a melting temperature.

Other aspects of the disclosed copper-carbon composition will become apparent from the following description, the accompanying drawings and the appended claims.

DETAILED DESCRIPTION

Figure 1:
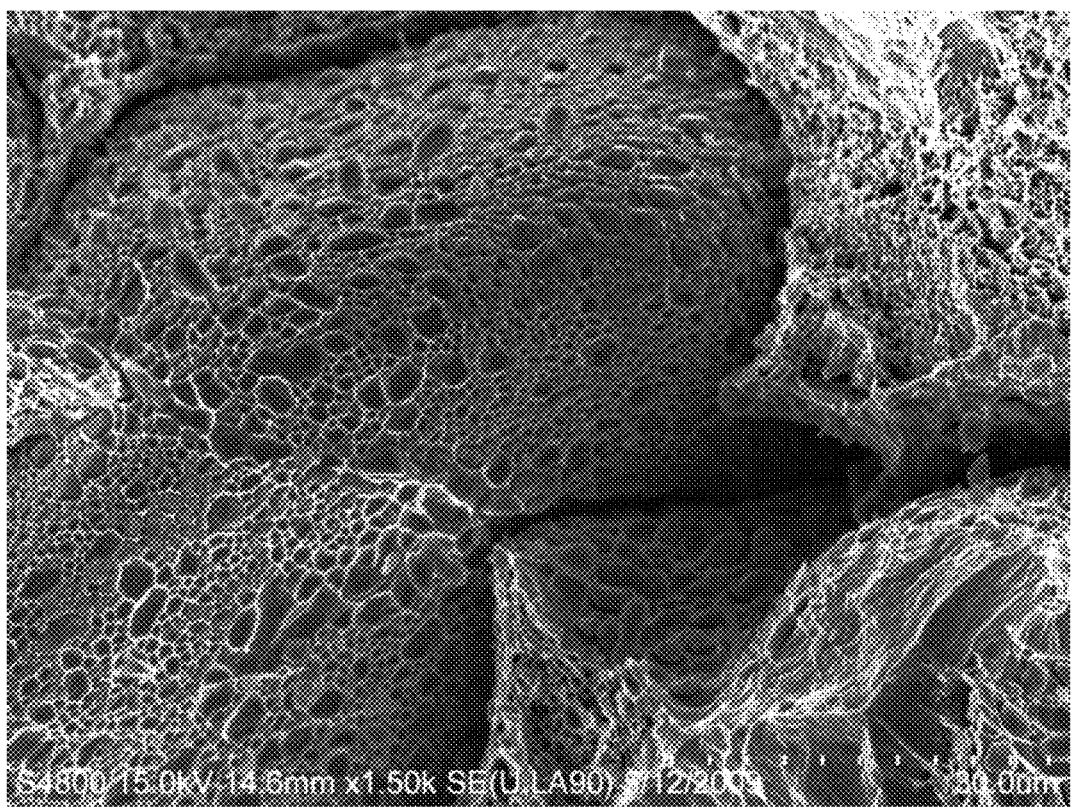
FIG. 1 is a scanning electron microscope image of the disclosed copper-carbon composition, the image showing a 30 μm wide portion of the composition.
Figure 2:
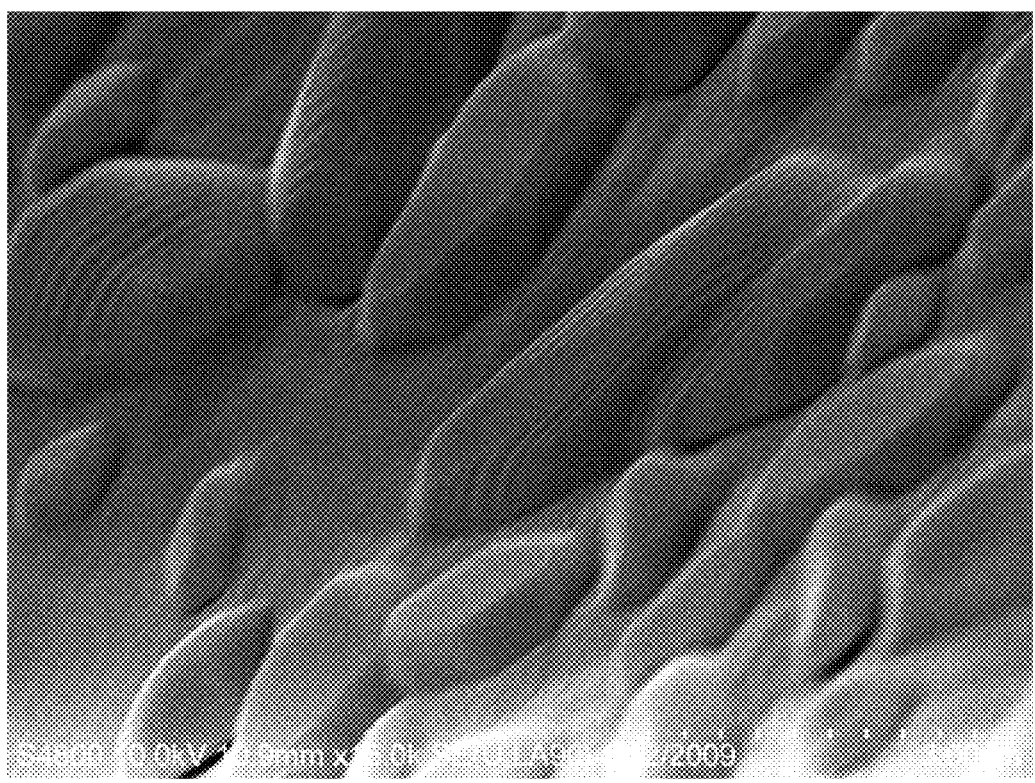
FIG. 2 is a scanning electron microscope image of the disclosed copper-carbon composition, the image showing a 3 μm wide portion of the composition.
Figure 3:
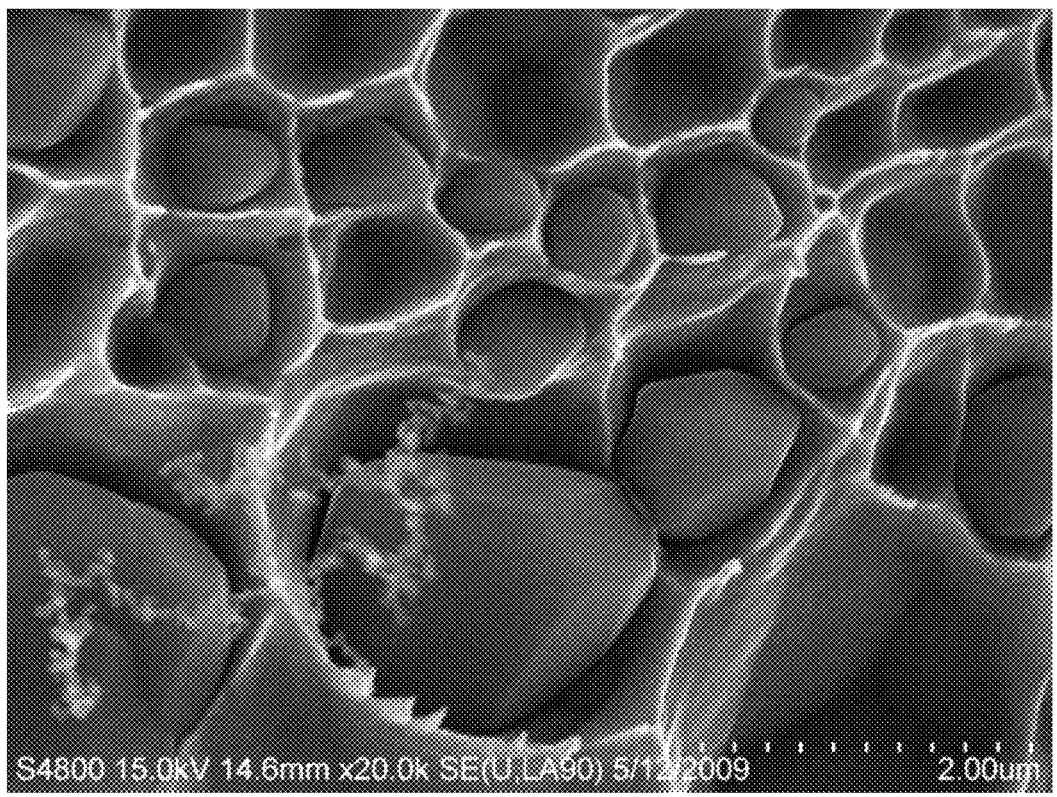
FIG. 3 is a scanning electron microscope image of the disclosed copper-carbon composition, the image showing a 2 μm wide portion of the composition.
Figure 4:
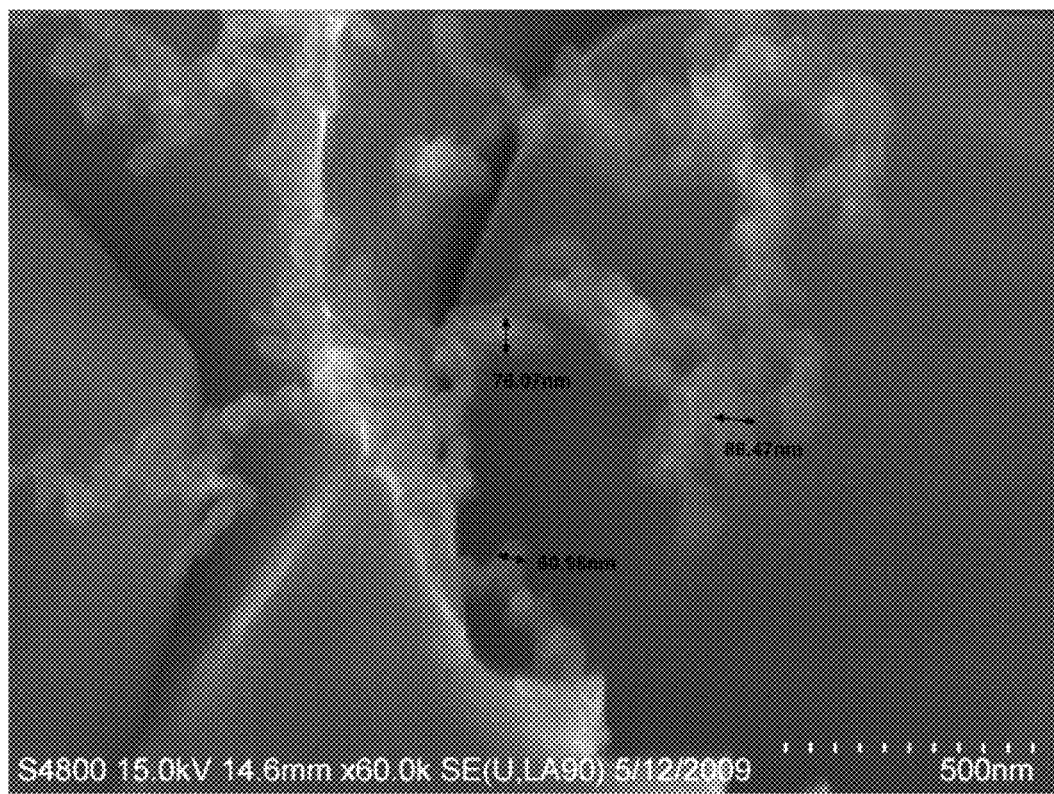
FIG. 4 is a scanning electron microscope image of the disclosed copper-carbon composition, the image showing a 500 nm wide portion of the composition.

It has now been discovered that carbon can be incorporated into copper metal in substantial quantities to form a single phase material, and in such a way that the carbon does not phase separate from the copper when the material is melted.

Specifically, it has now been discovered that carbon can be incorporated into copper metal by melting the copper metal, mixing the carbon into the molten copper metal and, while mixing, applying a current of sufficient amperage to the molten mixture such that the carbon becomes incorporated into the copper metal, thereby forming a single phase copper-carbon material. The resulting single phase copper-carbon material does not phase separate when subsequently re-melted (i.e., raised to a temperature at or above the materials melting temperature).

The carbon in the disclosed copper-carbon composition may be obtained from any carbonaceous material capable of producing the disclosed copper-carbon composition. For example, high surface area carbons, such as activated carbons, and certain functionalized carbons have yielded desirable results. Another example of a useful carbonaceous material is an allotrope of carbon, such as diamond, graphite and Buckminster fullerenes. While those skilled in the art can appreciate that many different forms of carbon exist, without being limited to any particular theory, it is believed that certain forms of carbon yield the disclosed copper-carbon composition, while others do not.

The copper in the disclosed copper-carbon composition may be any copper or copper alloy capable of producing the disclosed copper-carbon composition. Those skilled in the art will appreciate that the selection of copper may be dictated by the intended application of the resulting copper-carbon composition. For example, when high electrical conductivity is desired, oxygen free, high purity copper metal may be used and the disclosed copper-carbon composition may be formed in a vacuum or under a blanket of oxygen-free and electrically non-conductive gas.

In one aspect, the disclosed copper-carbon composition may comprise at least about 0.01 percent by weight carbon. In another aspect, the disclosed copper-carbon composition may comprise at least about 0.1 percent by weight carbon. In another aspect, the disclosed copper-carbon composition may comprise at least about 1 percent by weight carbon. In another aspect, the disclosed copper-carbon composition may comprise at least about 5 percent by weight carbon. In another aspect, the disclosed copper-carbon composition may comprise at least about 10 percent by weight carbon. In another aspect, the disclosed copper-carbon composition may comprise at least about 20 percent by weight carbon. In yet another aspect, the disclosed copper-carbon composition may comprise at least about 53 percent by weight carbon.

As used herein, the terms "single phase" and "phase separate" refer to phases discernable by the naked eye or using only slight magnification (e.g., at most about 100 times magnification). Therefore, a material appearing as a single phase to the naked eye, but showing two distinct phases when viewed on the nano-scale should not be construed as having two phases.

While the exact chemical structure of the disclosed copper-carbon material is currently not known, without being limited to any particular theory, it is currently believed that the steps of mixing and applying electrical energy result in the formation of chemical bonds between the copper and carbon atoms, thereby rendering the disclosed copper-carbon compositions unique vis-à-vis known copper-carbon composites and solutions of copper and carbon. Furthermore, without being limited to any particular theory, it is believed that the disclosed copper-carbon material may be a nano-composite material. Still furthermore, without being limited to any particular theory, it is believed that the amount of electrical energy (e.g., the current) applied to form the disclosed copper-carbon composition should be sufficient to initiate an endothermic chemical reaction between the copper and the carbon.

The disclosed copper-carbon compositions will be better understood with reference to the following examples:

EXAMPLES

Example 1

A graphite crucible (electrically coupled to ground) was positioned in a gas heated furnace. The crucible was charged with 100.795 ounces of 99.999 percent pure oxygen free, high purity ("OFHP") copper. The OFHP copper was cut from a rod obtained from ThyssenKrupp Materials NA of Southfield, Mich.

Once the copper in the crucible was melted, the agitator end of a rotary mixer was inserted into the molten copper and the rotary mixer was actuated to form a vortex in the molten copper. While mixing, 142 grams of powdered activated carbon was introduced to the molten copper. A small quantity of the carbon escaped as it was being added to the molten copper. The powdered activated carbon used was WPH®-M powdered activated carbon, available from Calgon Carbon Corporation of Pittsburgh, Pa. The temperature of the copper and carbon mixture was measured to be about 2335° F.

A carbon electrode affixed to an arc welder was inserted into the molten copper and carbon mixture. The arc welder was obtained from The Lincoln Electric Company of Cleveland, Ohio. While continuing to mix the carbon into the molten copper, the arc welder was actuated to supply a 135 amp current through the molten copper and carbon mixture. As a result of the current, the carbon was seen as being drawn into the copper and the resulting copper-carbon composition solidified almost instantly, suggesting an endothermic reaction had occurred. Specifically, the temperature of the resulting copper-carbon composition in the crucible quickly dropped from about 2335° F. to below about 1980° F.

After cooling, the copper-carbon composition was removed from the crucible and observed by the naked eye to exist in a single phase. The cooled copper-carbon composition was then re-melted in the crucible and no phase separation was observed (i.e., a separate carbon only or copper only phase did not occur).

While the copper-carbon composition was in a molten state, pin samples were taken. The pin samples were quickly and easily rolled out into thin sheets and no fractures were observed along the edges of the thin sheets.

Example 2

A graphite crucible (electrically coupled to ground) was positioned in an induction furnace. The induction furnace was obtained from the Pillar Induction Company of Brookfield, Wis. The crucible was charged with 20 pounds of C11000 copper obtained from ThyssenKrupp Materials NA.

Once the copper in the crucible was melted, the agitator end of a rotary mixer was inserted into the molten copper and the rotary mixer was actuated to form a vortex in the molten copper. While mixing, 154 grams of WPH®-M powdered activated carbon was introduced to the molten copper over a period of about 13 minutes. A small quantity of the carbon escaped as it was being added to the molten copper. The temperature of the copper and carbon mixture was measured to be about 2200° F.

A carbon electrode affixed to a Lincoln arc welder was inserted into the molten copper and carbon mixture. While continuing to mix the carbon into the molten copper, the arc welder was actuated to supply a 230 amp current through the molten copper and carbon mixture. As a result of the current, the carbon was seen as being drawn into the copper to form a copper-carbon composition. Additional heat was supplied during the current supplying step to avoid rapid solidification of the copper-carbon composition and resulting damage to the rotary mixer.

After cooling, the copper-carbon composition was removed from the crucible and observed by the naked eye to exist in a single phase. The cooled copper-carbon composition was then re-melted in the crucible and no phase separation was observed.

Example 3

Comparative Example

A graphite crucible (electrically coupled to ground) was positioned in a gas heated furnace. The crucible was charged with 100.2 ounces of 99.9 percent pure copper, which was obtained from ThyssenKrupp Materials NA.

Once the copper in the crucible was melted, the agitator end of a rotary mixer was inserted into the molten copper and the rotary mixer was actuated to form a vortex in the molten copper. While mixing, 14 grams of exfoliated graphite was introduced to the molten copper. The temperature of the copper and exfoliated graphite mixture was measured to be about 2247° F.

A carbon electrode affixed to a Lincoln arc welder was inserted into the molten copper and exfoliated graphite mixture. While continuing to mix the exfoliated graphite into the molten copper, the arc welder was actuated to supply a 240 amp current through the molten copper and exfoliated graphite mixture. No temperature drop was observed once the current was supplied.

After cooling, a copper phase and a carbon phase was observed in the crucible and, therefore, it was believed that the disclosed copper-carbon composition was not formed.

Accordingly, the disclosed copper-carbon compositions incorporate certain carbonaceous materials into copper metal in substantial quantities to form a single phase material, wherein the carbonaceous material does not phase separate from the copper when the material is cooled and subsequently re-melted.

Although various aspects of the disclosed copper-carbon composition have been shown and described, modifications may occur to those skilled in the art upon reading the specification. The present application includes such modifications and is limited only by the scope of the claims.

What is claimed is:

1. A copper-carbon composition comprising:
   copper chemically bonded to carbon, wherein said copper and said carbon form a single phase material formed by mixing carbon into molten copper and applying electrical energy through the mixture to initiate an endothermic reaction between the copper and the carbon;
   wherein the single phase material is a solid that is meltable; and
   wherein said carbon does not phase separate from said copper when said single phase material is subsequently re-melted.

2. The copper-carbon composition of claim 1 wherein said material consists essentially of said copper and said carbon.

3. The copper-carbon composition of claim 1 wherein said carbon comprises at least about 0.01 percent by weight of said material.

4. The copper-carbon composition of claim 1 wherein said carbon comprises at least about 0.1 percent by weight of said material.

5. The copper-carbon composition of claim 1 wherein said carbon comprises at least about 1 percent by weight of said material.

6. The copper-carbon composition of claim 1 wherein said carbon comprises at least about 10 percent by weight of said material.

7. The copper-carbon composition of claim 1 wherein said carbon comprises at least about 35 percent by weight of said material.

8. A copper-carbon composition consisting essentially of;
   copper chemically bonded to carbon formed by mixing carbon into molten copper and applying electrical energy through the mixture to initiate an endothermic reaction between the copper and the carbon,
   wherein said copper and said carbon form a single phase material as a result of the endothermic reaction,
   wherein said carbon comprises at least about 0.01 percent by weight of said single phase material and said single phase material is a solid that is meltable,
   wherein said carbon does not phase separate from said copper when said single phase material is subsequently re-melted.

9. The copper-carbon composition of claim 8 wherein said carbon comprises about 1 to about 5 percent by weight of said material.

10. The copper-carbon composition of claim 1 wherein a pin sample of the single phase material is rollable into a sheet.

11. The copper-carbon composition of claim 8 wherein a pin sample of the single phase material is rollable into a sheet.

* * * * *